United States Patent
Terajima

(10) Patent No.: US 9,638,929 B2
(45) Date of Patent: May 2, 2017

(54) ELECTROMAGNETIC DRIVING DEVICE

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology. Co., Ltd., Huizhou (CN)

(72) Inventor: Kokichi Terajima, Tokyo (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (HK); HUIZHOU DAYA BAY JSS OPTICAL TECHNOLOGY. CO., LTD., Huizhou (CN)

(*) Notice: Subject to any disclaimer, the term of this patent is extended or adjusted under 35 U.S.C. 154(b) by 113 days.

(21) Appl. No.: 14/564,009

(22) Filed: Dec. 8, 2014

(65) Prior Publication Data
US 2015/0160470 A1    Jun. 11, 2015

(30) Foreign Application Priority Data
Dec. 9, 2013   (JP) .................. 2013-254445

(51) Int. Cl.
G02B 27/64   (2006.01)
G02B 7/08    (2006.01)
G03B 5/06    (2006.01)

(52) U.S. Cl.
CPC ............. *G02B 27/646* (2013.01); *G02B 7/08* (2013.01); *G03B 5/06* (2013.01); *G03B 2205/0023* (2013.01); *G03B 2205/0069* (2013.01)

(58) Field of Classification Search
CPC .... G02B 27/64; G02B 27/644; G02B 27/646; G02B 7/04; G02B 7/08; G02B 7/09; G02B 15/14–15/28; G03B 13/32–13/36; G03B 2205/00–2205/0023; G03B 2205/0046–2205/0053; G03B 2205/0069; G03B 5/00–5/08; H04N 5/23248; H04N 5/23258; H04N 5/2328; H04N 5/23287
See application file for complete search history.

(56) References Cited

U.S. PATENT DOCUMENTS

| | | | | |
|---|---|---|---|---|
| 7,457,061 B2* | 11/2008 | Sata | ......................... | G02B 7/08 310/12.04 |
| 2012/0314308 A1* | 12/2012 | Ikushima | ................. | G02B 7/08 359/814 |
| 2013/0089311 A1* | 4/2013 | Jung | .................... | H04N 5/2257 396/55 |

FOREIGN PATENT DOCUMENTS

KR    WO 2011159117 A2 *   12/2011    ........... H04N 5/2257

* cited by examiner

*Primary Examiner* — Stephone B Allen
*Assistant Examiner* — Adam W Booher
(74) *Attorney, Agent, or Firm* — Hemisphere Law, PLLC

(57) ABSTRACT

The present invention aims to provide an electromagnetic driving device capable of efficiently driving swinging coils and being more miniaturized. A driving coil wound around the Z axis taken as a direction of the optical axis of a lens is mounted on a lens support. Magnets are mounted in an inner side box body for supporting the lens support to be capable of moving in the direction of Z axis. The swinging coils are mounted in an outer side box body for supporting the inner side box body to be capable of swinging in the direction orthogonal to the Z axis. The swinging coils includes a first to a fourth coils wound around axes orthogonal to the Z axis. The magnets include a plurality of magnet pieces configured opposite to the swinging coils.

2 Claims, 12 Drawing Sheets

ELECTROMAGNETIC DRIVING DEVICE

BACKGROUND OF THE INVENTION

1. Field of the Invention

The present invention relates to an electromagnetic driving device used in a camera for a mobile phone, in particular to an electromagnetic driving device capable of lens driving and with image stabilizer function.

2. Description of Related Art

In recent years, for a camera in a mobile phone, pixel count of an image sensor is increased so as to lead a high image quality of images. At the same time, a lens system loaded in the camera is also being transferred to a lens driving device with movable focuses from an existing lens driving device with fixed focuses. This is because that defocus appears in the lens driving device with fixed focuses and the resolution ratio of the image sensor with high pixel count cannot be responded.

As the lens driving device with movable focuses, most lens driving devices use voice coil motors (referring to Patent Literature 1: JP Patent No. 2004-280031, for instance). However, in the view of preventing shaking appearing easily during shooting, for the camera loaded in the mobile phone, an optical device for shooting, in Patent Literature 2: JP Patent No. 2009-294393 for instance, is provided.

In the optical device for shooting in Patent Literature 2, a movable frame loaded with the lens driving device and the image sensor is mounted to be capable of swinging relative to a fixed frame, a magnet for swinging the movable frame is mounted in the movable frame, and coils for swinging the movable frame are mounted in the fixed frame. Moreover, by electrifying the coils for swinging mounted in the fixed frame, the movable frame can swing relative to the fixed frame so as to inhibit (hand) shaking.

Moreover, the optical device 50 for shooting as shown in FIG. 12 is provided with a first coil 52a for lens driving and a second coil 52b for lens driving which are wound around the Z axis of the direction of the optical axis of the lens (an arrow as shown in figures) and are mounted on the lens support 51, a first magnet 54a for driving and a second magnet 54b for driving which are mounted on the inner side box body 53, are respectively partitioned at an interval and are mutually arranged opposite to the first coil 52a for lens driving and a second coil 52b for lens driving, and four coils 56 for swinging which are wound around the axis orthogonal to the Z axis and are mounted inside the outer side box body 55. The optical device 50 for shooting is used for driving in the direction of Z axis by utilizing the first and the second magnets 54a, 54b for driving and the first and the second coils 52a, 52b for lens driving, and is used for swinging the inner side box body 53 around the axis orthogonal to the Z axis by utilizing the magnets 54a, 54b for swinging and the coil 56 for swinging, and thus the hand shaking is corrected. Moreover, the optical device 50 for shooting is used for driving the lens and inhibiting the shaking at the same time by the magnet 54a for driving and the magnet 54b for driving, and thus the optical device for shooting like this can be miniaturized than Patent Literature 2 (in Patent Literature 3: JP Patent No. 2011-203476, for instance).

However, the optical device 50 for shooting in Patent Literature 3 needs the coil 52a for lens driving and the coil 52b for lens driving which are wound in opposite directions mutually. Moreover, the optical device 50 for shooting uses the following components respectively: the first and the second coils 52a, 52b for lens driving which are wound around the Z axis and are mounted on the lens support 51, the first magnet 54a for driving which is arranged opposite to the side 56a of the shot side of the coil 56 for swinging, a second magnet 54b for driving which is arranged opposite to the side 56b of the opposite side of the shot side, wherein the polarity of the second magnet 54b for driving is different from that of the first magnet 54a for driving, and thus the amount of the coils for driving and permanent magnets is increased. And then, the optical device 50 for shooting is such disposed that the coils 56 for swinging and the first and the second magnets 54a, 54b for driving are partitioned at intervals and are arranged opposite to one another, and thus the size in the orthogonal direction of Z axis is increased, and further miniaturization is further limited.

Moreover, in the optical device 50 for shooting in Patent Literature 3, only two sides 56a, 56b of the coils 56 for swinging are subjected to the effect of Lorentz force, and thus the problem of insufficient driving efficiency also appears.

BRIEF SUMMARY OF THE INVENTION

The object of the present invention is to provide an electromagnetic driving device capable of efficiently driving coils for swinging and being more miniaturized.

An electromagnetic driving device includes a lens support, an inner side box body, an outer side box body, a driving coil, magnets and swinging coils. The lens support is configured for retaining a lens. The inner side box body is configured for supporting the lens support to be capable of moving in a direction of Z axis parallel to an optical axis of the lens. The outer side box body is configured on the outer side of the inner side box body in a manner of surrounding the inner side box body so as to support the inner side box body to be capable of swinging. The driving coil is wound around the Z axis and mounted on the lens support. The plurality of magnets is mounted in the inner side box body. The plurality of swinging coils is mounted in the outer side box body. Each swinging coil includes a wire wrapping part wound around a axis vertical to the Z axis, and a coil component wound around the wire wrapping part. All of the plurality of swinging coils is configured around the Z axis at equal angles. The plurality of magnets includes a plurality of magnet pieces configured corresponding to the plurality of coil components and disposed around the Z axis at equal angles. When each magnet piece is observed in a direction vertical to the Z axis, the magnet piece and a corresponding one of the plurality of wire wrapping parts are partitioned at an interval and arranged opposite to each other on an inner side of the corresponding one of the plurality of wire wrapping parts. When each magnet piece is observed in the direction of Z axis, a magnetic pole face, adjacent to a corresponding one of the plurality of coil components and configured closer to the inner side box body than the corresponding one of the plurality of coil components, of the magnet piece and the corresponding one of the plurality of coil components are partitioned at an interval and arranged opposite to each other; or when each magnet piece is observed in the direction of Z axis, the magnetic pole face, adjacent to the corresponding one of the plurality of coil components, of the magnet piece is positioned on the inner sides of the corresponding one of the plurality of wire wrapping parts.

Thus, only one magnet is arranged opposite to each swinging coil, and thus the amount of the components can be reduced, and the facilitation of the assembly working procedure can be realized.

Moreover, the magnet pieces are such disposed that each magnetic pole face is vertical to a scroll direction of a corresponding swinging coil, and the magnetic pole face and ridges formed by two side surface adjacent to the magnetic pole face are configured inside the inner edges of the wire wrapping part of the swinging coil, and the magnetic pole face and the ridges are positioned opposite to the inner edges of the wire wrapping part with an interval, so that all the four edges of the swinging coil generate Lorentz force, and thus the dimensions in the direction orthogonal to the Z axis can be reduced. Thus, the running efficiency of the swinging coils can be greatly improved, and thus the miniaturization of the electromagnetic driving device can be realized.

Moreover, any of the two opposite magnetic pole faces and the ridges formed by the adjacent side surfaces can be arranged within the inner side of the inner edges of the wire wrapping part of the swinging coil, and the magnetic pole face and the ridges are arranged opposite to the wire wrapping part of the swinging coil with an interval.

Moreover, as another structure of the electromagnetic driving device of the present invention, a plurality of magnet yokes are configured on surfaces, adjacent to the outer side box body, of the plurality of magnet pieces and/or outside of the plurality of coil components.

From this, the magnetic flux density intersected (crossed) with four edges of each swinging coil can be improved, and the driving efficiency of the swinging coils can be improved further.

Moreover, as an exemplary embodiment of the present invention, each of the plurality of magnet yokes configured outside of the plurality of coil components includes a first magnet yoke covering a first edge of a corresponding one of the plurality of coil components from a front side of the Z axis, a second magnet yoke covering a second edge of the corresponding one of the plurality of coil components from a rear side of the Z axis, two third magnet yokes respectively covering a third edge and a fourth edges of the corresponding one of the plurality of coil components in a direction orthogonal to the Z axis from a side different from a magnetization direction of a corresponding one of the plurality of magnet pieces, and a fourth magnet yoke covering a winding side, close to the corresponding one of the plurality of magnet pieces, of the corresponding one of the plurality of coil components.

According to the above-mentioned magnet yokes, the magnetic flux density crossed with each edge of the swinging coil can be improved more reliably.

Moreover, the summary of the invention does not list all features required by the present invention, and auxiliary combination of these features can also become the present invention.

BRIEF DESCRIPTION OF THE SEVERAL VIEWS OF THE DRAWING(S)

The foregoing and other exemplary purposes, aspects and advantages of the present invention will be better understood in principle form the following detailed description of one or more exemplary embodiments of the invention with reference to the drawings, in which.

DETAILED DESCRIPTION OF THE INVENTION

Hereinafter, the embodiments of the electromagnetic driving device will be further described in detail with reference of the attached drawings and the specific embodiments. The following embodiments do not intend to confine the present invention relevant to the scope of claims, and all combinations of the features described in the embodiments are not necessarily included in the solutions of the present invention.

Embodiment I

Figure 1A:
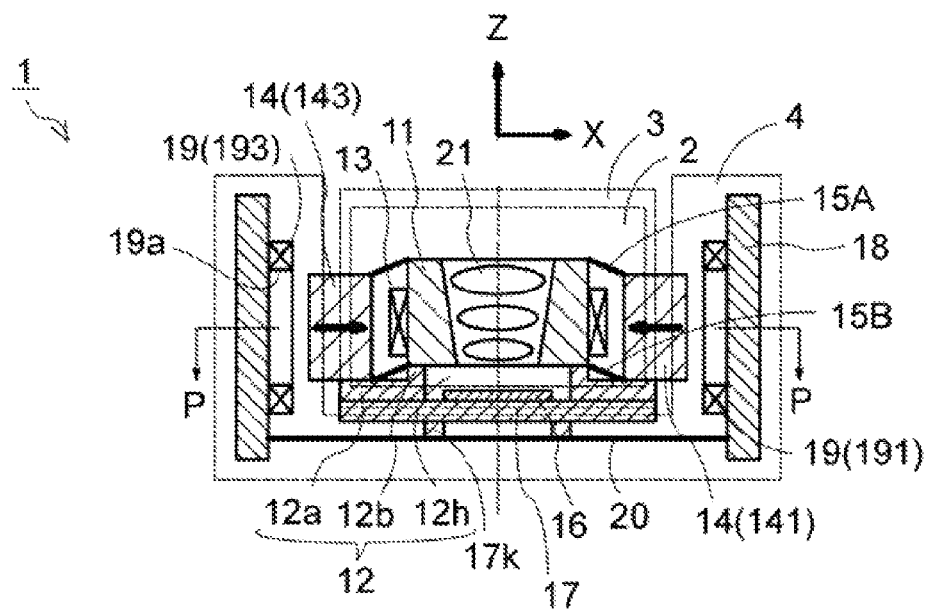
FIG. 1A and FIG. 1B are cross-sectional views illustrating the structure of an electromagnetic driving device in a first embodiment of the present invention.
Figure 1B:
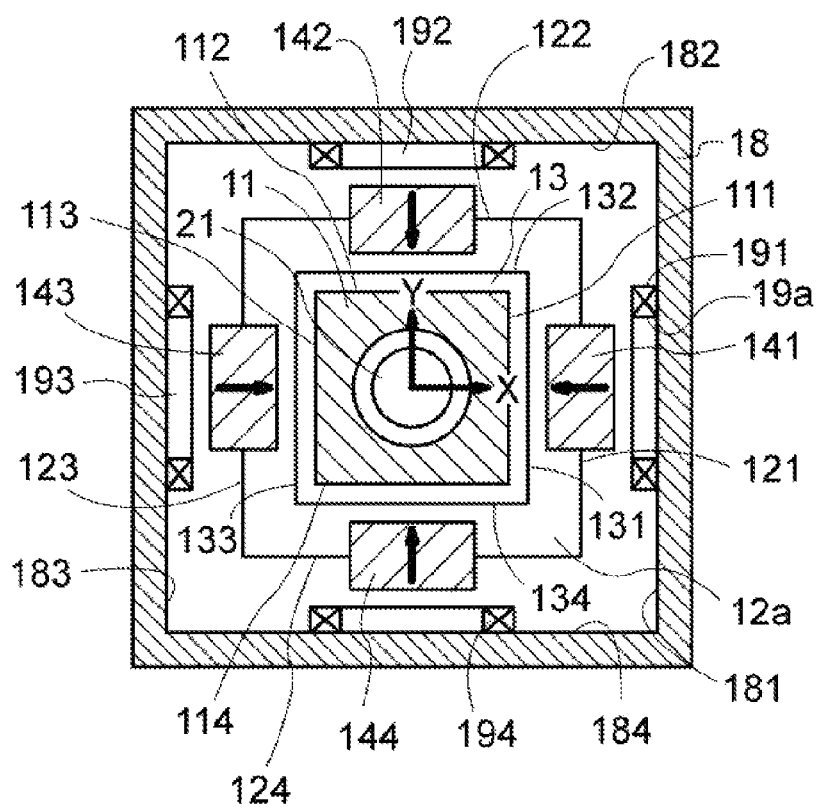

FIG. 1 A and FIG. 1B are cross-sectional views illustrating the structure of an electromagnetic driving device 1 in a first embodiment of the present invention. FIG. 1A is a longitudinal cross-sectional view, and FIG. 1B is a transverse sectional view along P-P of FIG. 1A.

As shown in FIG. 1A, the electromagnetic driving device 1 includes a lens support 11, an inner side box body 12, a driving coil 13 for driving the lens, magnets 14 for driving the lens, a front side spring component 15A, a rear side spring component 15B, an image sensor 16, a sensor substrate 17, an outer side box body 18, swinging coils 19 and a swinging spring component 20.

In the following description, the direction of the optical axis of a lens 21 mounted on the lens support 11 is taken as the direction of Z (Z axis), and two mutually orthogonal directions orthogonal to the Z axis are taken as the direction of X (X axis) and the direction of Y (Y axis) respectively. Moreover, the side of the object that is to be shot is taken as the front side of the Z axis (+Z side).

A lens driving device 2 includes the lens support 11, the inner side box body 12, the driving coil 13, the magnets 14 for driving, the front side spring component 15A and the rear side spring component 15B. An optical device 3 includes the lens driving device 2, the image sensor 16 and the sensor substrate 17. A shaking inhibiting device 4 includes the magnets 14 for driving, the outer side box body 18, the swinging coils 19 and the spring component 20 for swinging. The magnets 14 for driving the lens is also configured for inhibiting shakings of the optical device 3, thus the magnets 14 are shared by both the optical device 3 and the shaking inhibiting device 4.

As shown in FIG. 1B, the lens support 11 is a square frame-shaped component with side walls 111, 113 which are vertical to the X axis (parallel to the Y axis) and side walls 112, 114 which are vertical to the Y axis (parallel to the X axis). The lens 21 composed of the combination of object lenses or eye lenses is retained on the inner sides of the side walls 111-114, and the driving coil 13 is mounted on the outer circumference surfaces of the side walls 111-114.

The inner side box body 12 includes a square plate-shaped base plate 12a and a circular ring-shaped limiting component 12b. An opening part 12h is defined in a central part of the base plate 12a. The limiting component 12b protrudes from an outer circumference of the opening part 12h towards the lens support 11. The inner side box body 12 is used for supporting the lens support 11 to be capable of moving in the direction of Z axis. The limiting component 12b is used for limiting the lens support 11 at a lowest position when the driving coil 13 is not electrified.

The front side spring component 15A and the rear side spring component 15B are respectively mounted to the lens support 11 in a state of being more offset to the +Z side than the circular ring-shaped limiting component 12b. Thus, under the condition that even if the lens driving device 2 faces upwards or downwards, the spring components 15A, 15B can retain the lens support 11 at the lowest position stably.

The driving coil 13 is wound around the Z axis in a square frame shape, and is mounted on the outer surfaces of the side walls 111-114 of the lens support 11. Below, each of the edges forming the wire wrapping part of the driving coil 13, which is mounted on a corresponding side wall 11j of the side walls of the lens support 11 are labeled as 13j (in which j=1~4). Namely, the edges of the driving coil 13, corresponding to side walls 111, 112, 113, 114, of the lens support 11 are labeled as edges 131, 132, 133 and 134 respectively.

The magnets 14 for driving include a first magnet piece 141, second magnet piece 142, a third magnet piece 143, and a fourth magnet piece 144.

The first to the fourth magnet pieces 141, 142, 143, 144 are all mounted on the central parts of the edges 121, 122, 123, 124 of the base plate 12a of the inner side box body 12, and are disposed around the Z axis at equal angles, and each faces to an after-mentioned coil component of a swinging coil. Moreover, the edges 12j (j=1~4) of the base plate 12a refer to the outer fringe of the base plate 12a including the four edges formed on the periphery of the base plate 12a.

The first to the four magnet pieces 141 to 144 are block-shaped permanent magnets. One end of each magnet piece, close to the lens support 11, is magnetized into N pole, and the other end of each magnet piece, close to the outer side box body 18, is magnetized into S pole. The first magnet piece 141 is magnetized along the direction of −X axis, and is mounted on the edge 121 of the base plate 12a of the inner side box body 12. The second magnet piece 142 is magnetized along the direction of −Y axis, and is mounted on the edge 122 of the base plate 12a. The third magnet piece 143 is magnetized along the direction of +X axis, and is mounted on the edge 123 of the base plate 12a. Moreover, the fourth magnet piece 144 is magnetized along the direction of +Y axis, and is mounted on the edge 124 of the base plate 12a.

Namely, when any of the first to the fourth magnet pieces 141, 142, 143, 144 is the magnet piece 14j (j=1-4), the magnet piece 14j is such disposed that the magnetic pole face faces the lens support 11 is N poles, and the N pole magnetic pole face and the edge 13j of the driving coil 13 are partitioned at intervals and arranged opposite to each other.

The image sensor 16 is mounted on a surface of the sensor substrate 17, the surface of the sensor substrate 17 is close to the lens support 11. The image sensor 16 is used for detecting the image of the object that is focused by the lens 21.

The sensor substrate 17 is a square plate-shaped component on the −Z side of the inner side box body 12. A frame-shaped mounting part 17k for attaching the swinging spring component 20 is mounted on the central part of other surface of the sensor substrate 17. The other surface of the sensor substrate 17 is opposite to the surface of the sensor substrate 17 which is close to the lens support 11. The frame-shaped mounting part 17k protrudes towards the −Z side from the sensor substrate 17.

The outer side box body 18 is disposed on the outer side of the inner box body 12 in a manner of surrounding the driving coil 13, and is used for supporting the inner side box body 12 to be capable of swinging. The outer side box body 18 is a square frame-shaped component including side walls 181, 183 vertical to the X axis and side walls 182, 184 vertical to the Y axis. The swinging coils 19 are mounted on the inner side of the outer side box body 18.

The swinging coils 19 are wound around the axis (X axis or Y axis) vertical to (orthogonal to) the Z axis, and is provided with a first coil 191, a second coil 192, a third coil 193, and a fourth coil 194. The first to the fourth coils 191, 192, 193, 194 taken as coil components are disposed around the Z axis at equal angles, and are respectively wound on wire wrapping parts wound in the directions vertical to the Z axis, and are mounted at the central parts of the side walls 181, 182, 183, and 184 of the outer side box body 18. In more detail, the first coil 191 is wound around the X axis, and is mounted on the side wall 181 of the outer side box body 18. The second coil 192 is wound around the Y axis, and is mounted on the side wall 182. The third coil 193 is wound around the X axis, and is mounted on the side wall 183. The fourth coil 194 is wound around the Y axis, and is mounted on the side wall 184.

Hereon, the wire wrapping parts of the first to the fourth coils 191, 192, 193, 194 are formed to be square frame-shaped. In the wire wrapping parts, inner circumference parts 19a are formed in the inner circumference side of the wire wrapping parts. The lengths of the long edges of the inner circumference parts 19a which are parallel to the Z axis and the lengths of the long edges of the inner circumference parts which are parallel to the X axis or the Z axis are all greater than the lengths of the edges, parallel to the Z axis or X axis or Y axis, of the magnetic pole faces of the first to the fourth magnet pieces 141, 142, 143, 144. When any coil of the first to the fourth coils 191, 192, 193, 194 is set to be the coil 19j (j is equal to 1-4), the magnet piece corresponding to the coil 19j is magnet piece 14j. Moreover, under the condition that the magnet piece 14j is observed in the direction (direction of X axis or direction of Y axis) vertical to the Z axis, the magnet piece 14j and the wire wrapping part of the coil 19j are partitioned at intervals and arranged opposite to each other. In other words, under the condition that the magnet piece 14j is observed in the direction vertical to the Z axis, the coil 19j is disposed to surround the outer edges of the magnet piece 14j.

Namely, as shown in FIGS. 1A, B, when the magnet pieces 14 are observed in the direction (direction of X axis or direction of Y axis) vertical to the Z axis, the outer edges of the magnet piece 14j (j is chose from 1, 2, 3, 4) and the inner sides (inner circumference parts) of the coil 19j are partitioned at intervals and are arranged opposite to each other, respectively. More in detail, the outer edges of the magnet piece 14j and the inner sides of the inner circumference part 19a of the wire wrapping part of the coil 19j are partitioned at an interval and are arranged opposite to each other. That is to say, the magnet piece 14j can be arranged on the inner side of the inner circumference part 19a of the coil 19j.

Moreover, when the magnet piece 14j is observed in the direction of Z axis, the magnetic pole face close to the coil 19j and the coil 19j are partitioned at an interval and are arranged opposite to each other, and the magnetic pole face close the coil 19j is configured closer to the inner side box body 12 than the coil 19j. That is to say, the magnet piece 14j is mounted in the inner side box body 12 at the state of being separated from the coil 19j at a preset distance in the direction of X axis or the direction of Y axis.

Figure 2A:
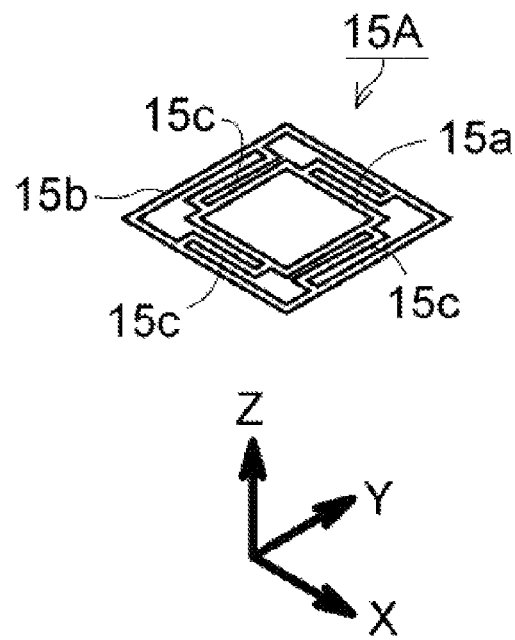
FIG. 2A and FIG. 2B are perspective views of a spring component for driving the lens according to an example of the present invention.

As shown in FIG. 2A, the front side spring component 15A is provided with a square frames-shaped inner circumference part 15a, a square frame-shaped outer circumference part 15b and four wrist parts 15c. The outer circumference part 15b is positioned on the outer side of the inner circumference part 15a and is disposed to surround the inner circumference part 15a. The wrist parts 15c are used for connecting the inner circumference part 15a with the outer circumference part 15b. The inner circumference part 15a is fixed on the outer edge part of the lens support 11 from the +Z side, and the outer circumference part 15b is fixed on the +Z side surfaces of the first to the fourth magnet pieces 141, 142, 143, 144.

Figure 2B:
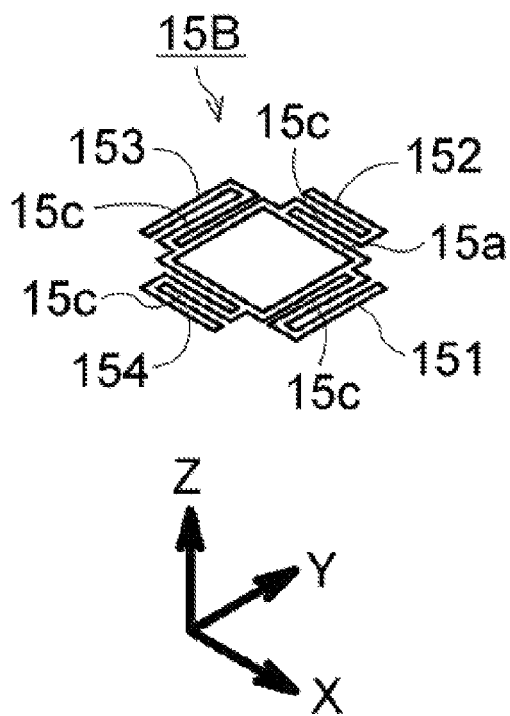

As shown in FIG. 2B, the rear side spring component 15B is of a structure that is similar to that of the front side spring component 15A, the difference is that the outer circumference part 15b is divided into four outer circumference sheets 151, 152, 153,154. The inner circumference part 15a is fixed on the outer edge part on the –Z axis side of the lens support 11. The outer circumference sheets 151, 152, 153,154 are respectively fixed between the –Z axis side surfaces of the first to the fourth magnet pieces 141, 142, 143, 144 and the +Z side surface of the base plate 12a of the inner side box body 12. The wrist parts 15c serve as springs for suspending the lens support 11 on the inner side box body 12 so as to play roles.

Figure 2C:
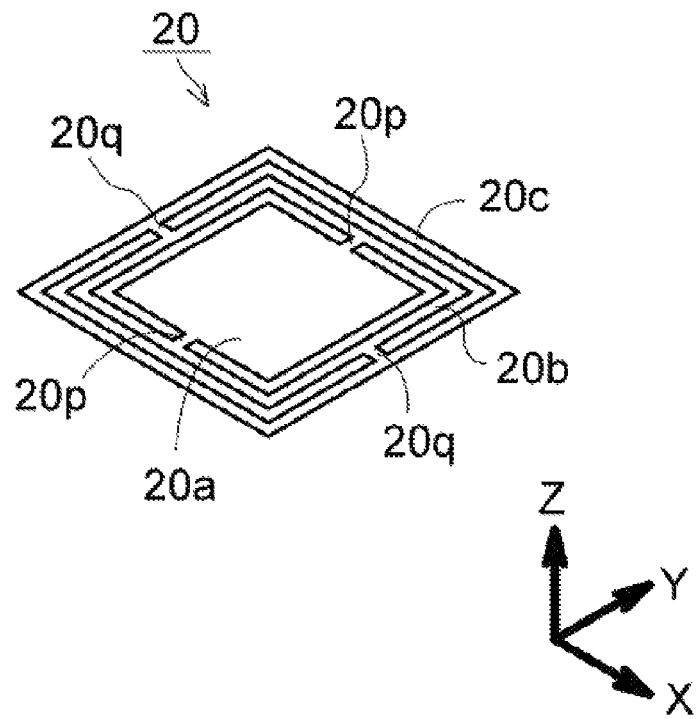
FIG. 2C is a perspective view of a swinging spring component according to an example of the present invention.

As shown in FIG. 2C, the swinging spring component 20 is provided with a square plate-shaped inner circumference part 20a, a square frame-shaped middle part 20b, a square frame-shaped outer circumference part 20c, two connecting parts 20p and two connecting parts 20q. The middle part 20b is disposed on the outer side of the inner circumference part 20a in a manner of surrounding the inner circumference part 20a. The outer circumference part 20c is disposed on the outer side of the middle part 20b in a manner of surrounding the middle part 20b. The two connecting parts 20p are used for connecting the inner circumference part 20a with the middle part 20b. The two connecting parts 20q are used for connecting the middle part 20b with the outer circumference part 20c.

The inner circumference part 20a is fixed on the mounting part 17k arranged on the –Z axis side of the sensor substrate 17, and the outer circumference part 20c is fixed on the –Z side of the outer side box body 18. The swinging spring component 20 is used for suspending the optical device 3 on the outer side box body 18, and acts as a spring to play roles depending on the twists of the connecting parts 20p, 20q, as a result, the optical device 3 is capable of swinging.

Figure 3:
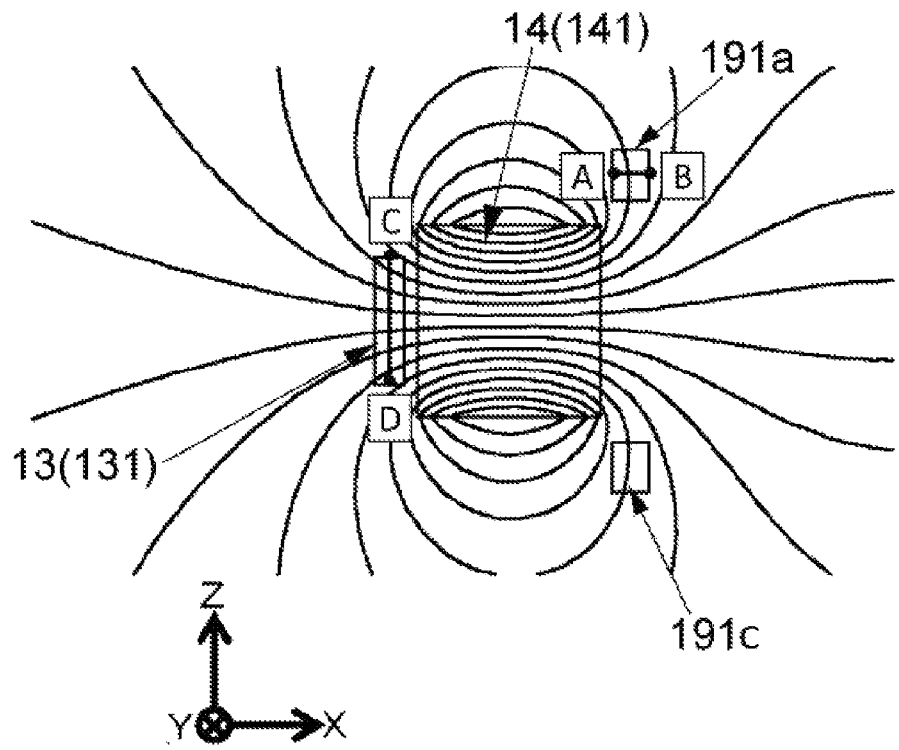
FIG. 3 is a diagram illustrating an example of a distribution of a magnetic field generated by a magnet for driving the lens.

FIG. 3 is a diagram illustrating the distribution of a magnetic field generated by the magnet piece 141 of the magnets 14.

From the figure, the magnet piece 141 generates a magnetic field (on the edge 131 of the driving coil 13) in the direction substantially orthogonal to the extension direction (direction vertical to the paper surface) of the edge 131, namely the direction (direction of X axis) of the magnetic field is different from the axis direction (direction of Z axis) of the driving coil 13. Moreover, the magnet piece 141 generates a magnetic field (on the four edges of the first coil 191, FIG. 3 only illustrates the +Z side edge 191a and the –Z side edge 191c, but it is similarly for the edge on the +Y side and the edge on the –Y side)) in the direction substantially orthogonal to the extension direction of the edges of the first coil 191, namely the direction of the magnetic field is different from the axis direction of the first coil 191 (in the direction of Z axis on the edges 191a, 191b on the ±Z sides, in the direction of Y axis on the edge on the ±Y side).

Figure 4A:
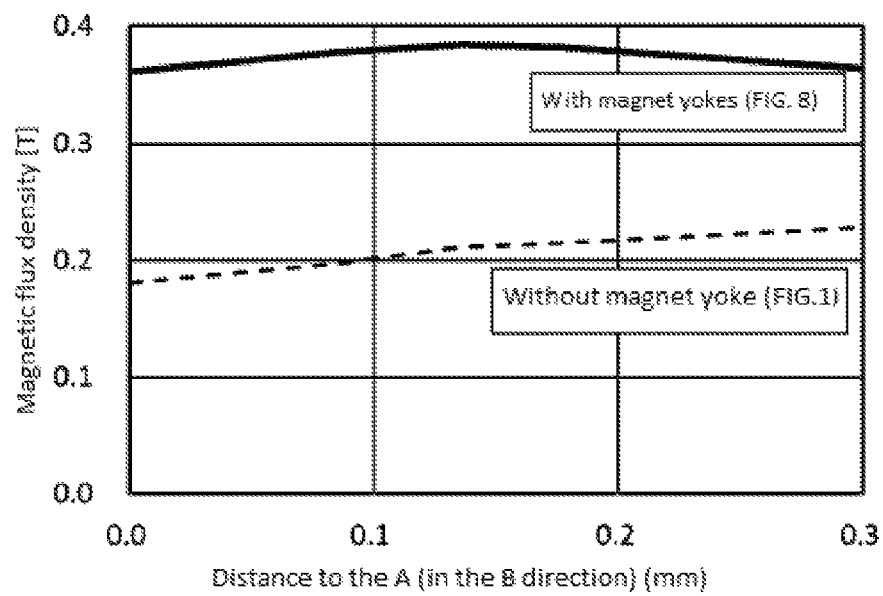
FIG. 4A and FIG. 4B are diagrams illustrating the distributions of magnetic flux density crossed with coils for swinging and coils for driving.
Figure 4B:
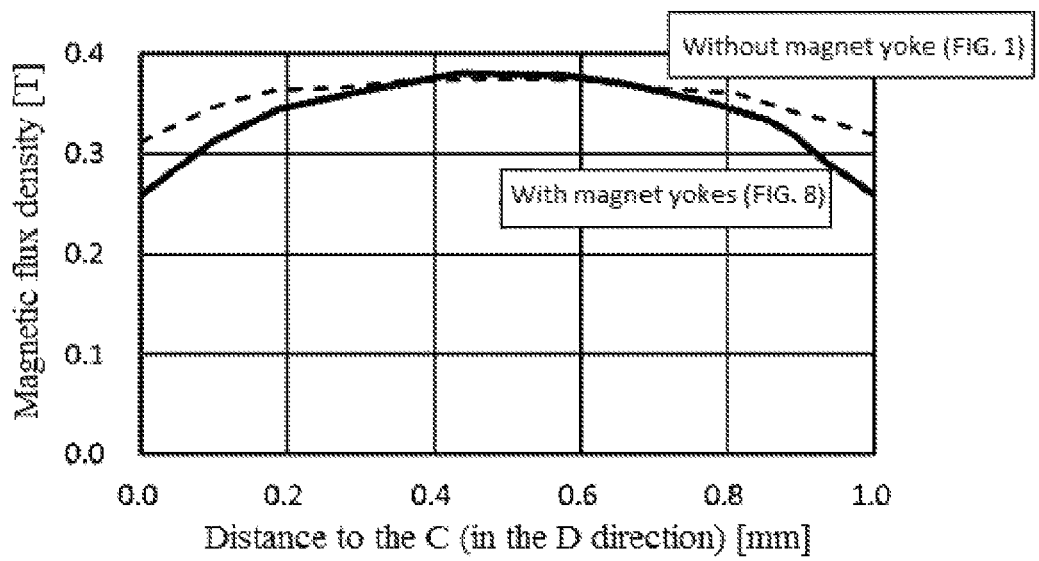

FIG. 4A and FIG. 4B are diagrams illustrating the distributions of magnetic flux density crossed with the swinging coils 19 and driving coil 13 respectively.

The imaginary line as shown in FIG. 4A illustrates the magnetic flux density of the magnetic field in the direction of Z axis intersected (crossed) with the +Z side edge 191a of the first coil 191 for swinging. Horizontal axes in the figure illustrate the distance (mm) beginning from the point A of the +Z side edge 191 close to one side of the magnet piece 141 as shown in FIG. 3, to a point (measuring point) between the point A and the point B of the +Z side edge 191 close to the other opposite side of the magnet piece 141. Moreover, the longitudinal axes illustrate the magnetic flux density (T) on the measuring point.

As shown in FIG. 3, on the +Z side edge 191a of the first coil 191, the change of the magnetic flux density between point A and point B of the wire wrapping part is smooth, and thus the approximately uniform magnetic field parallel to the Z axis is generated. Moreover, the fact is the same as the condition on the –Z side edge 191b, –Y side edge, and +Y side edge of the first coil 191.

Imaginary lines as shown in FIG. 4B illustrate the magnetic flux density of the magnetic field in the direction of X axis intersected (crossed) with the edge 131 of the driving coil 13. Horizontal axes in the figure illustrate the distance (mm) beginning from point C of the +Z side end of the edge 131 as shown in FIG. 3, to a point (measuring point) between the point C and the point D of the –Z side end of the edge 131.

With respect to the driving coil 13, similarly, on the edge 131 of the driving coil 13, the change of magnetic flux density between point C and point D becomes gentle, and thus an approximately uniform magnetic field parallel to the direction of X axis is generated. Therefore, the edge s13 of the driving coil 13 can be driven by utilizing driving magnets 14 (magnet piece 14j), and the four edges of the first coil to the fourth coil 19 can effectively generate Lorentz force.

Then, operations of the electromagnetic driving device 1 are described hereinafter.

Figure 5:
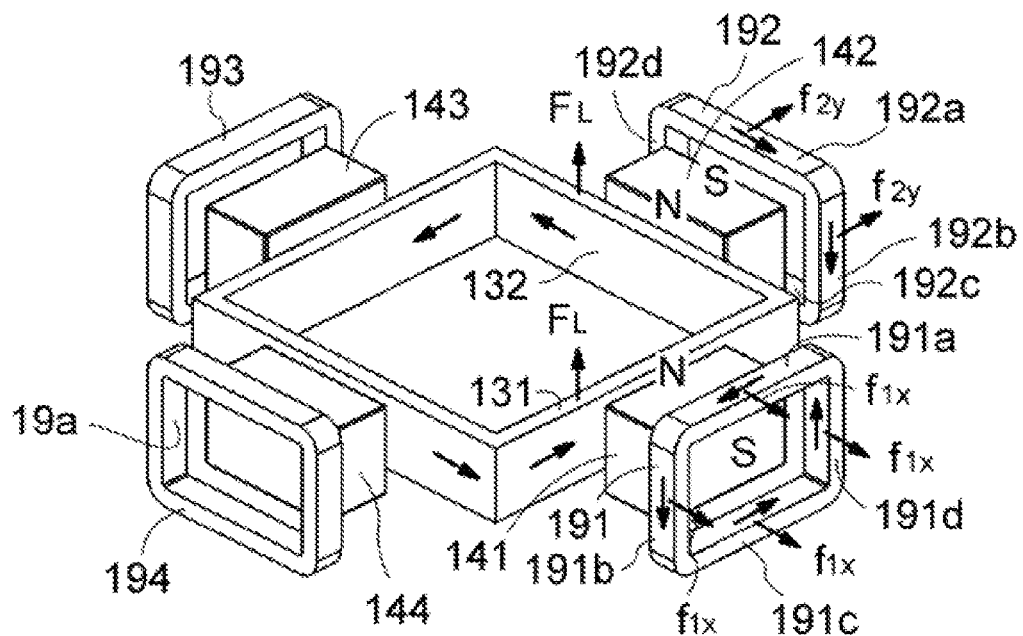
FIG. 5 is a perspective view of an electromagnetic driving device, which only illustrates the main parts of the electromagnetic driving device in the first embodiment.

As shown in FIG. 5, the electromagnetic driving device 1 in the first embodiment is such configured that one magnetic pole face of the j-th magnet piece 14j between edge 131 of the driving coil 13 and the j-th coil 19j is arranged to face to the edge 13j of the driving coil 13 and separated from the edge 13j with an interval, and the other magnetic pole face of the j-th magnet piece 14j is arranged to face to the inner side of the wire wrapping part of the j-th coil 19j (specifically means the inner side of the inner circumference part 19a of the wire wrapping part) and separated from it with an interval.

That is to say, the edge 13j, close to the magnet piece 14j, of the driving coil 13 and the magnetic pole face, close to the driving coil 13, of the magnet piece 14j are arranged at a mutually separated state at a preset distance. Moreover, the magnetic pole face, close to the j-th coil 19 19j, of the j-th magnet piece 14j and the j-th coil 19j are disposed to be at a mutually separated state at a preset distance.

Hereon, the magnetic poles, close to the driving coil 13, of the first to fourth magnet pieces 141, 142, 143, 144 are all N poles, and the magnetic poles close to the first to the fourth coils 191, 192, 193, 194 are all S poles. Under such condition, the first magnet piece 141 generates a magnetic field whose direction is the direction of −Z axis, on the +Z side edge 191a of the first coil 191. Moreover, the first magnet piece 141 generates a magnetic field whose direction is the direction of +Y axis on the −Y side edge 191b, a magnetic field in the direction of +Z axis on the −Z side edge 191c, and a magnetic field in the direction of −Y axis on the +Y side edge 191d.

Therefore, when a current flowing in clockwise direction around the X axis is supplied to the first coil 191, lorentz force $f_{1x}$ in the direction of +X axis is generated on the edges 191a, 191b, 191c, and 191d of the first coil 191. Moreover, when a current flowing in clockwise direction around the X axis is supplied to the third coil 193, similar to the first coil 191, lorentz force $f_{3x}$ (not shown in the figure) in the direction of +X axis is generated on the four edges of the third coil 193.

On the other hand, the second magnet piece 142 generates a magnetic field in the direction of −Z axis on the +Z side edge 192a of the second coil 192. Moreover, the second magnet piece 142 generates a magnetic field in the direction of −X axis on the +X side edge 192b, a magnetic field in the direction of +Z axis on the −Z side edge 192c, and a magnetic field in the direction of +X axis on the −X side edge 192d. Therefore, when a current flowing in clockwise direction around the Y axis is supplied to the second coil 192, lorentz force $f_{2y}$ in the direction of +Y axis is generated on the edges 192a, 192b, 192c, and 192d of the second coil 192. Moreover, when a current flowing in clockwise direction around the Y axis is supplied to the fourth coil 194, similar to the second coil 192, lorentz force $f_{4y}$ (not shown in the figure) in the direction of +Y axis is generated on the four edges of the fourth coil 194.

By using the swinging spring component 20, the inner side box body 12 provided with the first to the fourth magnet pieces 141, 142, 143, 144 is suspended on the outer side box body 18 which acts as a component for mounting and fixing the first to the fourth coils 191, 192, 193, 194, thus free swing of the inner side box body can be realized. Therefore, when the circumfluent current in clockwise direction around the X axis flows in the first coil 191, the edge 121 of the inner side box body 12 is subjected to the force $F_{1x}$ (not shown) in the direction of −X axis as a counteracting force of the lorentz force $f_{1x}$. Moreover, when the circumfluent current in clockwise direction around the X axis flows to the third coil 193, the edge 123 of the inner side box body 12 is subjected to the force $F_{3x}$ (not shown) in the direction of −X axis as a counteracting force of the lorentz force fix.

Under the condition that the inner side box body 121 is just suspended on the outer side box body 18 from the −Z side, when the edges 121, 123 of the inner side box body 12 are subjected to the forces $F_{1x}$, $F_{3x}$ in the direction of −X axis, the inner side box body 121 can rotate in counterclockwise direction around the Y axis and swing in the direction of −X axis.

Moreover, when the circumfluent current in clockwise direction around the Y axis flows in the second coil 192, the edge 122 of the inner side box body 12 is subjected to the force $F_{2y}$ in the direction of −Y axis as the counteracting force of the lorentz force $f_{2y}$; when the circumfluent current in clockwise direction around the Y axis flows to the fourth coil 194, the edge 124 of the inner side box body 12 is subjected to the force $F_{4y}$ in the direction of −Y axis as the counteracting force of the lorentz force $f_{4y}$. Under the condition that the edges 122, 124 of the inner side box body 12 are subjected to the forces $F_{2y}$, $F_{4y}$ in the direction of −Y axis, the inner side box body 12 can rotate in clockwise direction around the X axis and swing in the direction of −Y axis.

Thus, by controlling the current flowing in the first to the fourth coils 191, 192, 193, 194, the inner side box body 12 can swing in the direction vertical to the Z axis, and thus even if under the condition that the optical device 3 shakes, the shaking can also be inhibited reliably.

On the other hand, the edge 13j of the driving coil 13 and the j-th magnet piece 14j are partitioned at an interval and arranged opposite to each other (j=1~4). The magnet pieces generate a magnetic field in the direction of −X axis on the edge 131 of the driving coil 13, a magnetic field in the direction of −Y axis on the edge 132 of the driving coil 13, a magnetic field in the direction of +X axis on the edge 133 of the driving coil 13, and a magnetic field in the direction of +Y axis on the edge 134 of the driving coil 13, respectively. Thus, when circumfluent current in clockwise direction around the Z axis is flowing in the driving coil 13, the lens support 11 can move in the direction of −Z axis. lorentz force $F_L$ in the direction of +Z axis is generated on the edges 131, 132, 133, 134 of the driving coil 13.

By using the front side spring component 15A and the rear side spring component 15B, the lens support 11 with the driving coil 13 mounted thereon is movably mounted in the inner side box body 12 with the first to the fourth magnet pieces 141, 142, 143, 144 mounted thereon. The lens support 11 can move in the inner side box body 12 along the Z axis. When circumfluent current in clockwise direction around the Z axis is flowing in the driving coil 13, the lens support 11 moves in the direction of +Z axis, and when circumfluent current in counterclockwise direction around the Z axis is flowing in the driving coil 13, the lens support 11 moves in the direction of −Z axis.

Moreover, in the first embodiment, the square frame-shaped support is used as the lens support 11, but the shape of the lens support 11 can also be octagonal barrel-shaped or cylindrical frame-shaped.

Figure 6A:
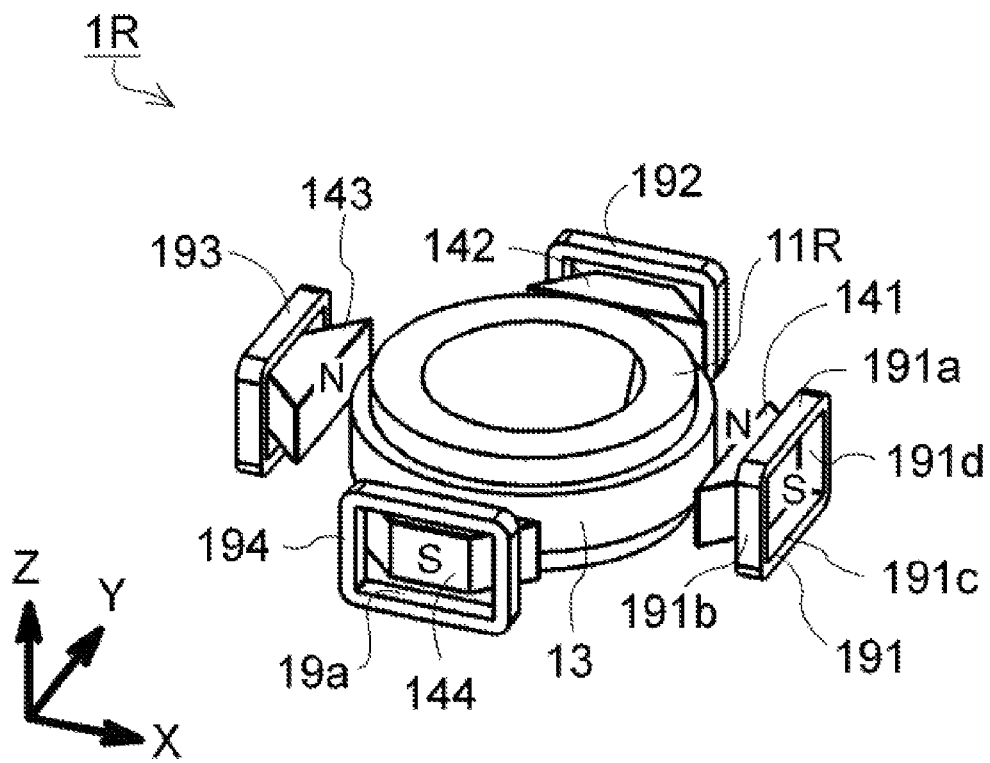
FIG. 6A is a perspective view and FIG. 6B is a cut-away view illustrating another structure of the electromagnetic driving device in the first embodiment of the present invention.
Figure 6B:
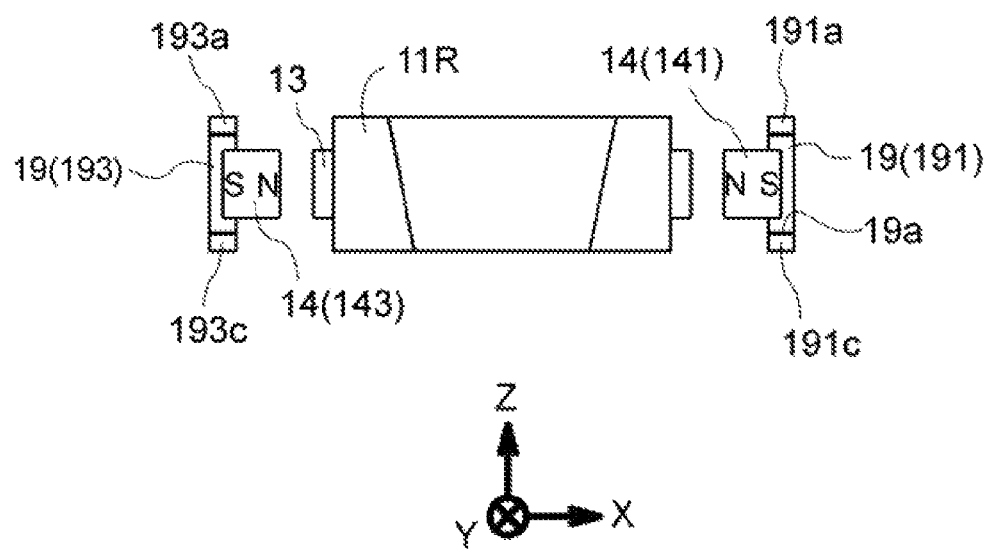

FIG. 6 A and FIG. 6B are diagrams illustrating the examples of the structure of the driving part of the electromagnetic driving device 1R using a cylindrical lens support 11R. Moreover, FIG. 6A is a perspective view, and FIG. 6B is a cross-sectional view cut along a Z-X plane penetrating through the center of the lens support 11R. In the electromagnetic driving device 1R, the first to the fourth magnet pieces 141, 142, 143, 144 and the first to the fourth coils 191, 192, 193, 194 are arranged on the +X side, the +Y side, the −X side and the −Y side of the lens support 11R at 90-degree intervals around the Z axis, and are respectively mounted in the inner side box body and the outer side box body which are not shown in the figures.

In the example, the shape of the j-th magnet piece 14*j* (j is chose from 1, 2, 3, 4) when being observed from the direction of Z axis is an isosceles trapezoid whose edge close to the driving coil 13 is longer than the edge close to the first coil 19*j* (j is chose from 1, 2, 3, 4). Therefore, the magnetic flux density intersected (crossed) with the driving coil 13 is increased.

Moreover, in the example, in the magnet piece 14*j*, the magnetic pole face close to the coil 19*j* is closer to the inner side than the wire wrapping part of the coil 19*j* (specifically means the inner circumference part 19*a* forming the inner frame of the wire wrapping part). That is to say, the magnet piece 14*j* is at the state of entering the inner circumference part 19*a* of the coil 19*j*. The reason of the setting lies in that the shape of the magnet piece 141 is set to be isosceles trapezoid, even if the magnetic pole face enters the position closer to the inner side than the wire wrapping part of the coil 19, the side face of the magnet piece 14*j* can also be inclined relative to the magnetization direction, and thus magnetic flux crossed with the coil 19 can be sufficiently obtained. Moreover, the magnetic pole face enters the position closer to the inner side than the wire wrapping part of the coil 19, so that the dimensions of the electromagnetic driving device 1R in the direction vertical to the Z axis can be further shortened.

Then, the operations for the electromagnetic driving device 1R are described.

As shown in FIGS. 6A, 6B, a magnetic field in the direction of −Y axis is generated on the +Y side edge 191*d* of the first coil 191 disposed in the +X direction, and a magnetic field in the direction of +Y axis is generated on the −Y side edge 191*b*. On the other hand, a magnetic field in the direction of −Z axis is generated on the +Z side edge 191*a*, and a magnetic field in the direction of +Z axis is generated on the −Z side edge 191*c*. Therefore, when circumfluent current in clockwise direction around the X axis flows in the first coil 191, lorentz force in the direction of +X axis is generated on the edges 191*a*, 191*b*, 191*c*, 191*d*.

Similarly, when the circumfluent current in clockwise direction around the Y axis flows in the second coil 192 disposed in the direction of +Y axis, lorentz force in the direction of +Y axis is generated on the second coil 192. Moreover, when the circumfluent current in clockwise direction around the X axis flows in the edges 193*a*, 193*b*, 193*c*, 193*d* of the third coil 193 disposed in the direction of −X axis, lorentz force in the direction of +X axis is generated on the third coil 193. Moreover, when the circumfluent current in clockwise direction around the Y axis flows in the fourth coil 194 disposed in the direction of −Y axis, lorentz force in the direction of +Y axis is generated on the fourth coil 194.

Therefore, by controlling the current flowing in the first to the fourth coil 191, 192, 193, 194, the inner side box body 12 can swing in the direction vertical to the Z axis, and thus even if under the condition that the optical device 3 shakes, the shaking can also be inhibited reliably. Moreover, in the electromagnetic driving device 1R, the magnetic fields can be effectively generated on all edges of the coil 191 to the coil 194, so that the driving efficiency of the swinging coils 19 can be improved, and thus the distances between the magnets 14 and the swinging coils 19 can be shortened. Therefore, the miniaturization of the electromagnetic driving device 1R can be realized.

Figure 7A:
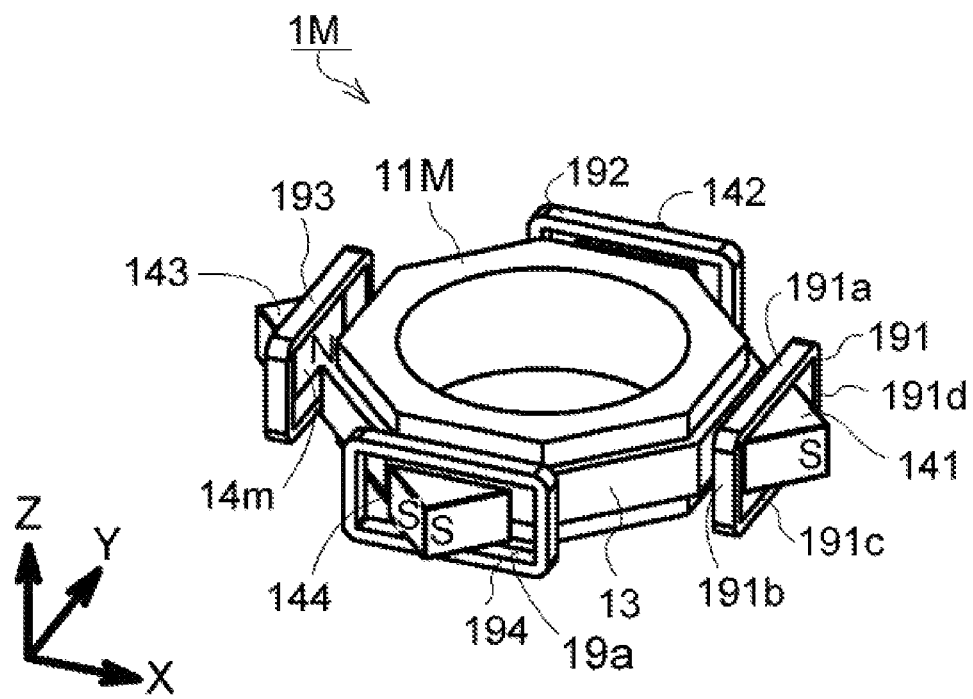
FIG. 7A is a perspective view and FIG. 7B is a cut-away view illustrating further another structure of the electromagnetic driving device in the first embodiment of the present invention.
Figure 7B:
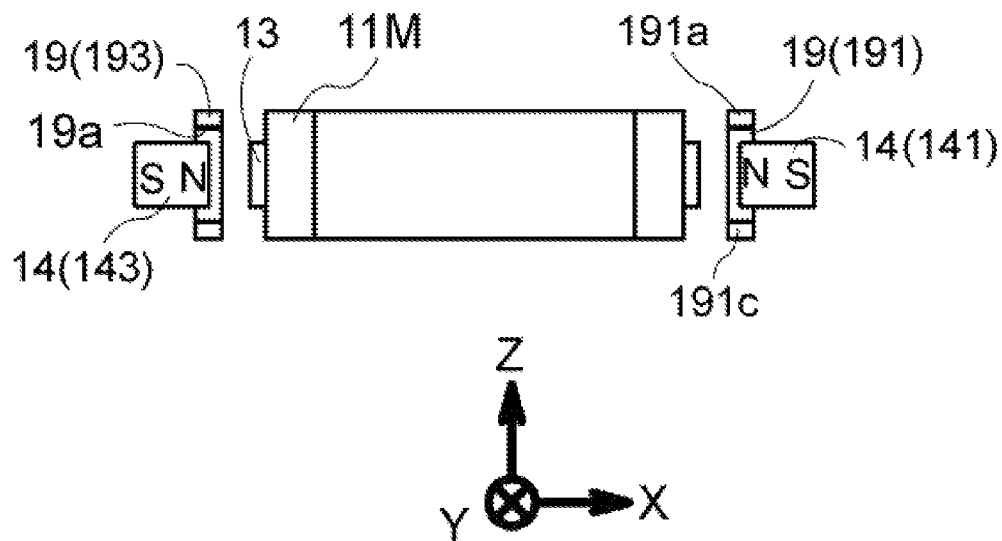

Moreover, the following structure is described in the first embodiment, namely, one magnetic pole face (N pole) of the magnet piece 14*j* (j is equal to 1 to 4) is disposed on the side of the driving coil 13, and the other magnetic pole face (S pole) of the magnet piece 14*j* is disposed on the side of the coil 19*j*, but the structure is not limited to the embodiment. For example, as shown in FIG. 7A, FIG. 7B, an electromagnetic driving device 1M can also be formed. In the example, the magnetic pole face 14*m* (N pole herein) close the driving coil 13, of the magnet piece 14*j* and the driving coil 13 are partitioned at an interval and arranged opposite to each other along the radial direction, and ridges connecting the magnetic pole face 14*m* with its adjacent side surfaces of the driving coil 13 (namely the magnetic pole face 14*m* and a part of two side surfaces of the magnetic pole face 14*m* of the magnetic piece) are configured within the inner side of the coil 19*j* (specifically means the inner side of the inner circumference part 19*a* of the wire wrapping part of the coil 19*j*), and are separated from the inner side of the coil 19*j* with an interval.

For the electromagnetic driving device 1M, a lens support 11M is formed to be octagonal, and a driving coil 13 is mounted on the periphery of the lens support 11M. The magnet piece 14*j* (j is equal to 1 to 4) and the coil 19*j* are disposed on the +X side, the +Y side, the −X side and the −Y side of the lens support 11M at 90-degree intervals around the Z axis, and are respectively mounted in the inner side box body and the outer side box body (not shown). Each magnet piece 14*j* is formed to be a right-angled isosceles triangle when being observed in the direction of Z axis. Moreover, each magnet piece 14*j* is such formed that the right-angled corner faces the outside, and the magnetic pole face 14*m* and the wire wrapping parts, parallel to the X axis or the Y axis, of the driving coil 13 are arranged opposite to each other.

In the example, in the magnet piece 14*j*, the magnetic pole face 14*m* close to the coil 19*j* enters the inner side of the coil 19*j*. This is the same to the isosceles trapezoid magnet piece, the side faces of the magnet piece 14*j* are inclined relative to the magnetization direction. Thus the shape of the magnet piece 14*j* is set to be isosceles right triangle, ever under the condition that the magnetic pole face 14*m* enters the inner side of the coil 19*j*, magnetic flux crossed with the coil 19 can be sufficiently obtained.

Moreover, the magnetic pole face 14*m* enters the inner side of the coil 19, the distance between the edge 13*j* of the driving coil 13 and the magnet piece 14*j* can be shortened, and the driving efficiency of the driving coil 13 in the direction of the Z axis can be improved, so that the dimensions of the electromagnetic driving device 1M in the direction vertical to the Z axis can be further shortened.

Then, the operations for the electromagnetic driving device 1M are described.

As shown in FIGS. 7A and 7B, for example, the magnetic field in the direction of +Y axis is generated on the +Y side edge 191*d* of the first coil 191 disposed in the direction of +X axis, and the magnetic field in the direction of −Y axis is generated on the −Y side edge 191*b*. On the other hand, the magnetic field in the direction of +Z axis is generated on the +Z side edge 191*a*, and the magnetic field in the direction of −Z axis is generated on the −Z side edge 191*c*.

Therefore, when the circumfluent current in counterclockwise direction around the X axis flows in the first coil 191, lorentz force in the direction of +X axis is generated on the edges 191*a*, 191*b*, 191*c*, 191*d*, namely, when the circumfluent current in counterclockwise direction around the X axis flows in the first coil 191 disposed in the direction of +X axis, lorentz force in the direction of +X axis is generated on the first coil 191.

Similarly, when the circumfluent current in counterclockwise direction around the Y axis flows to the second coil 192 disposed in the direction of +Y axis, lorentz force in the direction of +Y axis is generated on the second coil 192. Moreover, when the circumfluent current in counterclockwise direction around the X axis flows to the third coil 193 disposed in the direction of −X axis, lorentz force in the direction of +X axis is generated on the third coil 193, and when the circumfluent current in counterclockwise direction around the Y axis flows to the fourth coil 194 disposed in the direction of −Y axis, lorentz force in the direction of +Y axis is generated on the fourth coil 194.

Therefore, by controlling the current flowing to the first to the fourth coil 191, 192, 193, 194, the inner side box body 12 can swing in the direction vertical to the Z axis, and thus even if under the condition that the optical device 3 shakes, the shaking can also be inhibited reliably. Moreover, in the electromagnetic driving device 1M, the magnetic fields can be effectively generated on all edges of the coil 191 to the coil 194, so that the driving efficiency of the swinging coils 19 can be improved, and thus the distances between the magnets 14 and the swinging coils 19 can be shortened, and then the miniaturization of the electromagnetic driving device 1M can be realized.

Embodiment II

Figure 8:
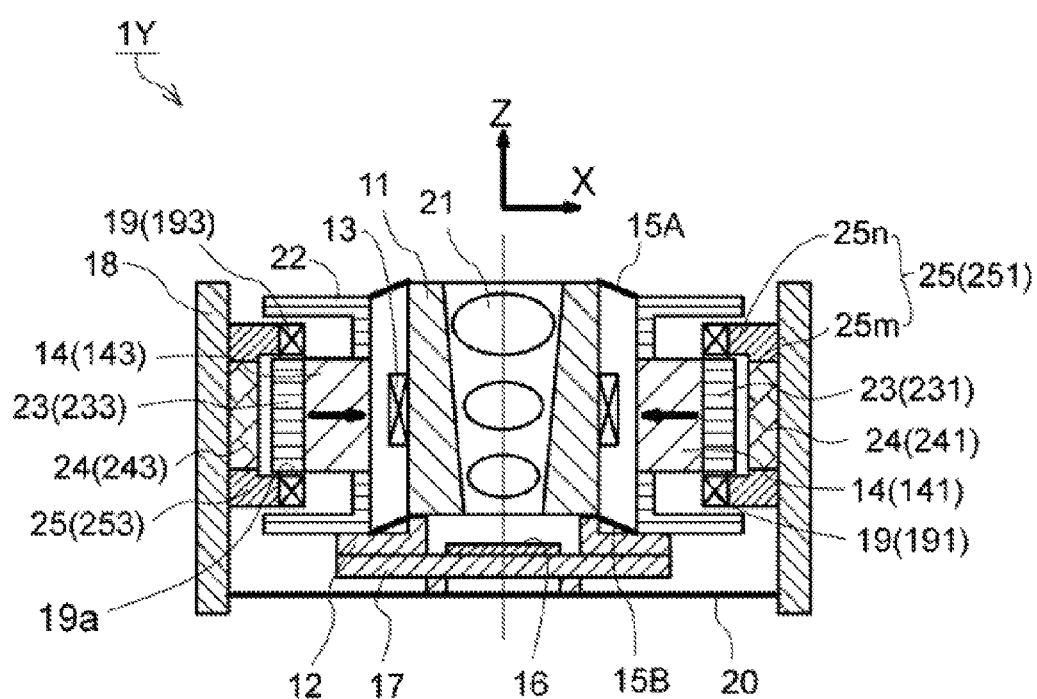
FIG. 8 is a cross-sectional view of an electromagnetic driving device in accordance to a second embodiment of the present invention.
Figure 9:
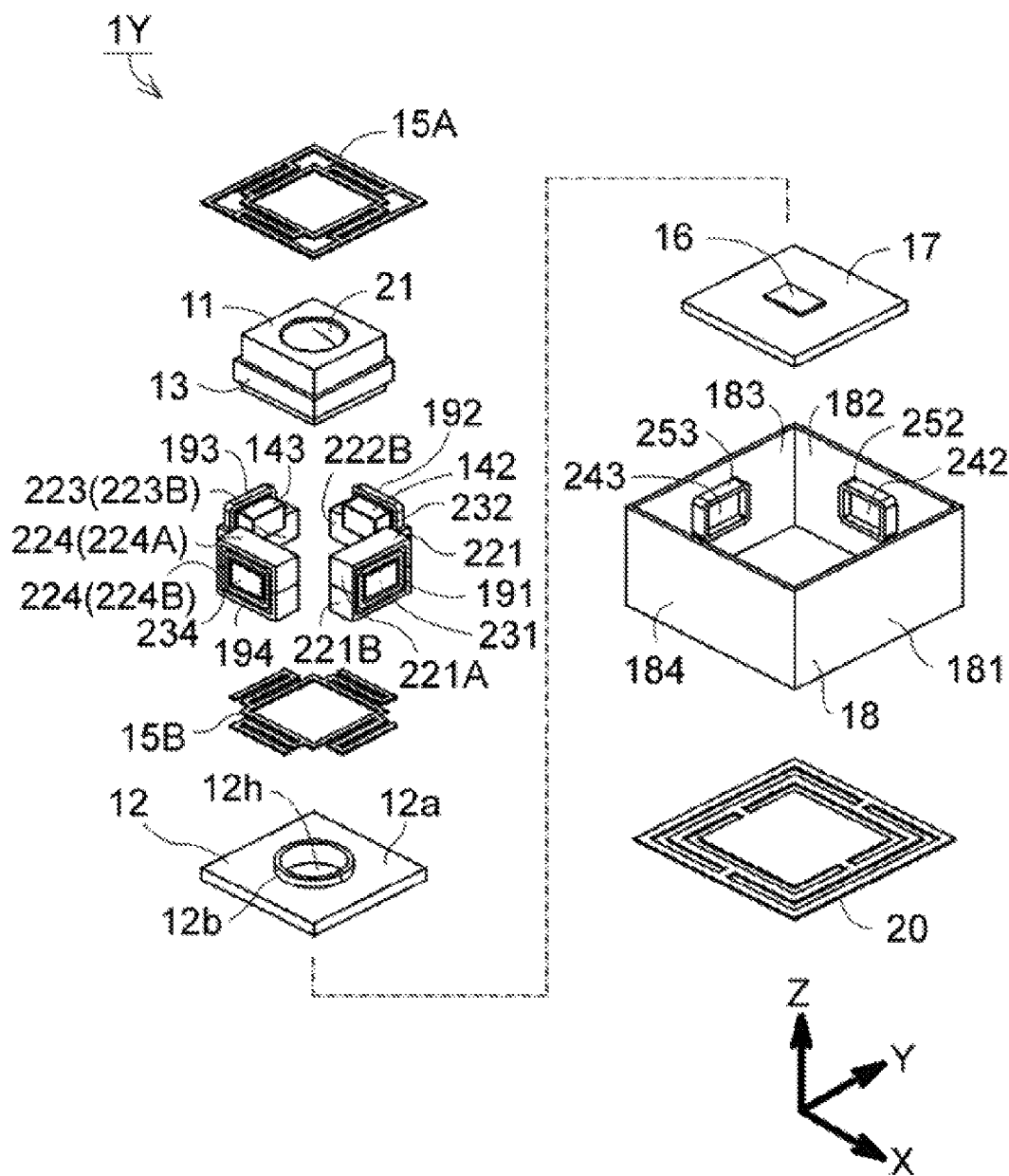
FIG. 9 is an exploded view of the electromagnetic driving device in the second embodiment of the present invention.

FIG. 8 is a longitudinal section view illustrating the structure of an electromagnetic driving device 1Y in the second embodiment, and FIG. 9 is an exploded view illustrating the structure of the electromagnetic driving device 1Y.

As shown in the figures, the electromagnetic driving device 1Y is provided with a lens support 11, an inner side box body 12, a driving coil 13, magnets 14 for driving, a front side spring component 15A, a rear side spring component 15B, an image sensor 16, a sensor substrate 17, an outer side box body 18, swinging coils 19, a swinging spring component 20, a frame-shaped magnet yoke 22, a coaxial (concentric) magnet yoke 23, non-magnetic electric conducting components 24, and coil mounting components 25 including a coil mounting component 251, a coil mounting component 252, a coil mounting component 253, and a coil mounting component 254. Moreover, the lens support 11 to the swinging spring component 20 are provided with the structures similar to those in the first embodiment, and thus same marks are used to label the same components, and the descriptions of the same components are omitted.

Figure 10A:
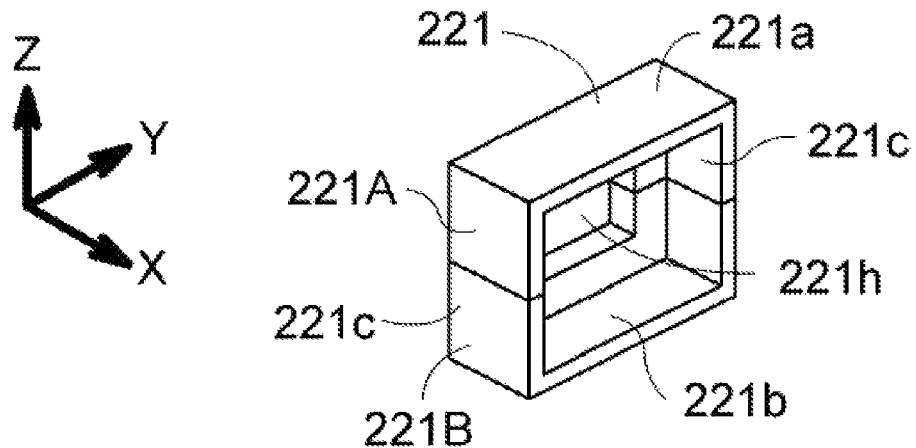
FIG. 10A is a perspective view and FIG. 10B is an exploded view illustrating an assembling relation between the magnets for driving and magnet yokes.
Figure 10B:
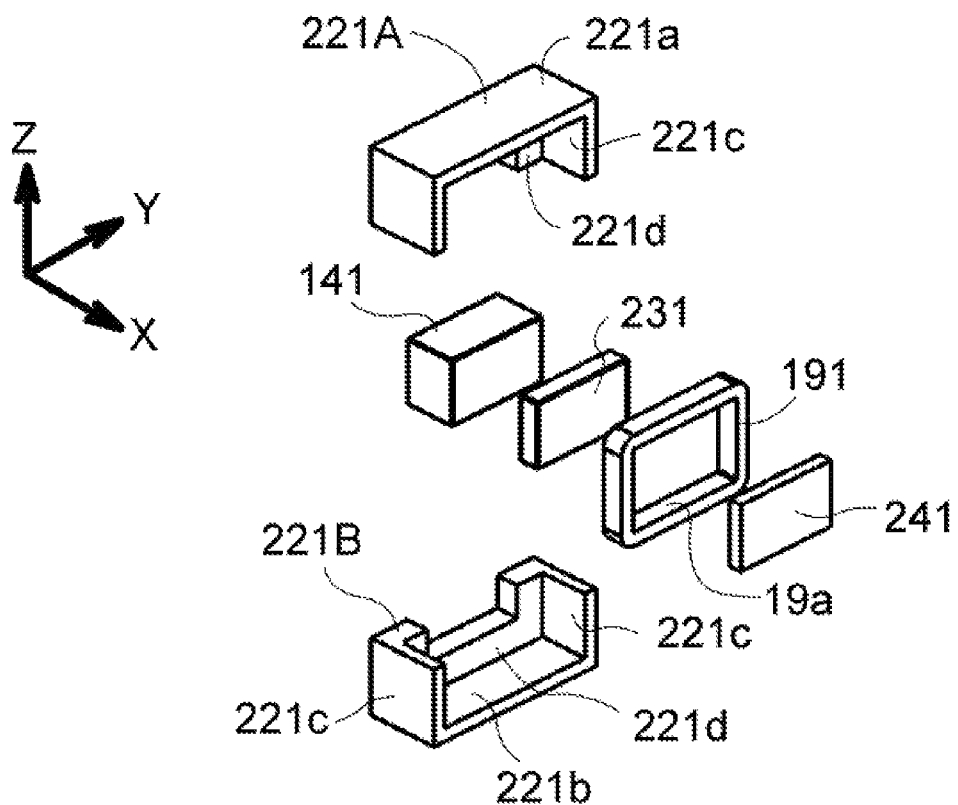

The frame-shaped magnet yoke 22 is arranged on the outer edge side of the swinging coils, and includes a first frame magnet yoke 221, a second frame magnet yoke 222, a third frame magnet yoke 223, and a fourth frame magnet yoke 224. As shown in FIG. 10A and FIG. 10B, the first frame magnet yoke 221 includes a first magnet yoke 221a, a second magnet yoke 221b, third magnet yokes 221c and a fourth magnet yoke 221d. The first magnet yoke 221a includes a plate vertical to the Z axis and is disposed in front of the Z axis. The second magnet yoke 221b includes a plate parallel to the first magnet yoke 221a and is disposed at the back of the Z axis. The third magnet yokes 221c includes two plates vertical to the Y axis and are respectively disposed in front of the Y axis and at the back of the Y axis. The fourth magnet yoke 221d includes a plate vertical to the X axis. Moreover, an opening part 221h larger than the magnetic pole face, adjacent to the driving coil 13, of the first magnet piece 141 is formed at the central part of the fourth magnet yoke 22d. The first frame magnet yoke 221 is formed to be a box-shaped component which is open in front of the X axis, and in view of assembly, the frame magnet yoke 221 is divided into two parts by a plane vertical to the Z axis. Moreover, the part of the frame magnet yoke 221, in front of the Z axis is taken as a front side magnet yoke component 221A, and the other part at the back of the Z axis is taken as a rear side magnet yoke component 221B. The rear side magnet yoke component 221B is mounted on the edge 121 of the base plate 12a of the inner side box body 12.

The first magnet yoke 221a covers the outer edge side of the coil component of the coil 191 from the front side of the Z axis. Moreover, the second magnet yoke 221b covers the outer edge side of the coil component from the rear side of the Z axis. The third magnet yokes 221c cover the outer edge side of the coil component from the +Y side and −Y side respectively which are different from the magnetization direction of the magnet piece and from directions orthogonal to the Z axis.

Moreover, the fourth magnet yoke 221d covers the coil 191 and the first magnet piece 141 from the side of the magnet piece 141. In more detail, the first magnet yoke 221a covers the coil 191 and the first magnet piece 141 from the front side of the Z axis, the second magnet yoke 221b covers the coil 191 and the first magnet piece 141 from the rear side of the Z axis, and the third magnet yokes 221c cover the coil 191 and the first magnet piece 141 from the +Y side and the −Y side. The magnetic pole face, close to the driving coil 13, of the first magnet piece 141 is disposed in the opening part 221h of the fourth magnet yoke 221d.

Moreover, in the above structures, structures of the second to the fourth frame magnet yokes 222, 223, 224 are also similar to that of the first frame magnet yoke 221. In the j-th frame magnet yoke 22j, the first magnet yoke 22ja covers the coil 19j and the j-th magnet piece 14j from the front side of the Z axis; the second magnet yoke 22jb covers the coil 19j and the j-th magnet piece 14j from the rear side of the Z axis; the third magnet yokes 22jc cover the coil 19j and the j-th magnet piece 14j respectively from the +Y side and the −Y side or the +X side and the −X side. Moreover, the magnetic pole face (N pole magnetic pole face) (j is equal to 1 to 4), adjacent to the driving coil 13, of the j-th magnet 14j is disposed in the opening part 22jb of the fourth magnet yoke 22jd. Moreover, in the exploded space diagram as shown in FIG. 9, in order to observe the diagram easily, the front side magnet yoke components 222A, 223A of the second and the third frame magnet yokes 222, 223 are omitted, the rear side magnet yoke components 222B, 223B of the second and the third frame magnet yokes 222, 223 are shown, and the front side magnet yoke components 221A, 224A and the rear side magnet yoke components 221B, 224B of the first and fourth frame magnet yokes 221, 224 are shown.

The coaxial magnet yoke 23 includes a first to a fourth coaxial magnet yokes 231, 232, 233, 234. The first coaxial magnet yoke 231 is disposed on the magnet pole face (S pole magnetic pole face), adjacent to the outer side box body 18, of the first magnet piece 141, and the first coaxial magnet yoke 231 and the inner side of the first coil 191 are partitioned at an interval and are arranged opposite to each other. In more detail, the first coaxial magnet yoke 231 is such disposed that the first coaxial magnet yoke 231 is positioned on the magnetic pole face, on the side of the outer side box body 18, of the first magnet piece 141, and the first coaxial magnet yoke 231 and the first coil 191 are partitioned at an interval and are arranged opposite to each other inside the inner circumference part 19a of the wire wrapping part of the first coil 191 (on the inner circumference side of the first coil 191).

That is to say, the j-th coaxial magnet yoke 23j is disposed on the magnetic pole face (S pole magnetic pole face), on the side of the outer side box body 18, of the j-th magnet piece 14j, and the j-th coaxial magnet yoke 23j and the wire wrapping part are partitioned at an interval and are arranged opposite to each other inside the inner circumference part 19a of the wire wrapping part of the j-th coil 19j.

The non-magnetic electric conducting component 24 is mounted at the central part of the inner side of the side walls 181, 182, 183, 184 of the outer side box body, and is provided with a first to a fourth non-magnetic components 241, 242, 243, 244. The first to the fourth non-magnetic components 241, 242, 243,244 are all square plate-shaped components made of electric conducting materials, and are preferably non-magnetic good conductors made of copper, aluminum and the like. Moreover, the first to the fourth non-magnetic components 241, 242, 243,244 can also be mounted and fixed to the outer side box body 18 in a thin plate shape, and are formed through electroplating or evaporation.

The j-th non-magnetic component 24j (j is equal to 1 to 4) and the j-th magnet piece 14j are arranged opposite to each other through the j-th coaxial magnet yoke 23j. Thus, the j-th magnet piece 14j mounted in the inner side box body 12 can be close to or far away from the j-th non-magnetic component 24j, and the size of the magnetic field acting to the first non-magnetic component 24j from the j-th magnet piece 14j can change. Thus, the eddy current equivalent to the size of the magnetic field is generated on the j-th non-magnetic component 24j, so that braking force acts on the inner side box body 12 on which the j-th magnet piece 14j is mounted.

Moreover, in the example, the coil mounting components 251, 252, 253, 254 in closed box shapes are mounted on the side walls 181, 182, 183, 184 of the outer side box body on the side of the lens support 11. The first to the fourth coils 191, 192, 193, 194 and the first to the fourth non-magnetic components 241, 242, 243,244 are respectively mounted on the coil mounting components 251, 252, 253, 254.

Each of the box-shaped coil mounting components 251, 252, 253, 254 includes a square frame-shaped base plate 25m mounted on the side walls 181, 182, 183, 184 of the outer side box body 18 and projection pieces 25n extruding from the four edges of the base plate 25m towards the lens support 11. The non-magnetic electric conducting component 24 is mounted in the frame defined in the base plate 25m, and the swinging coil 19 is mounted on the end of the projection pieces 25n.

Figure 11:
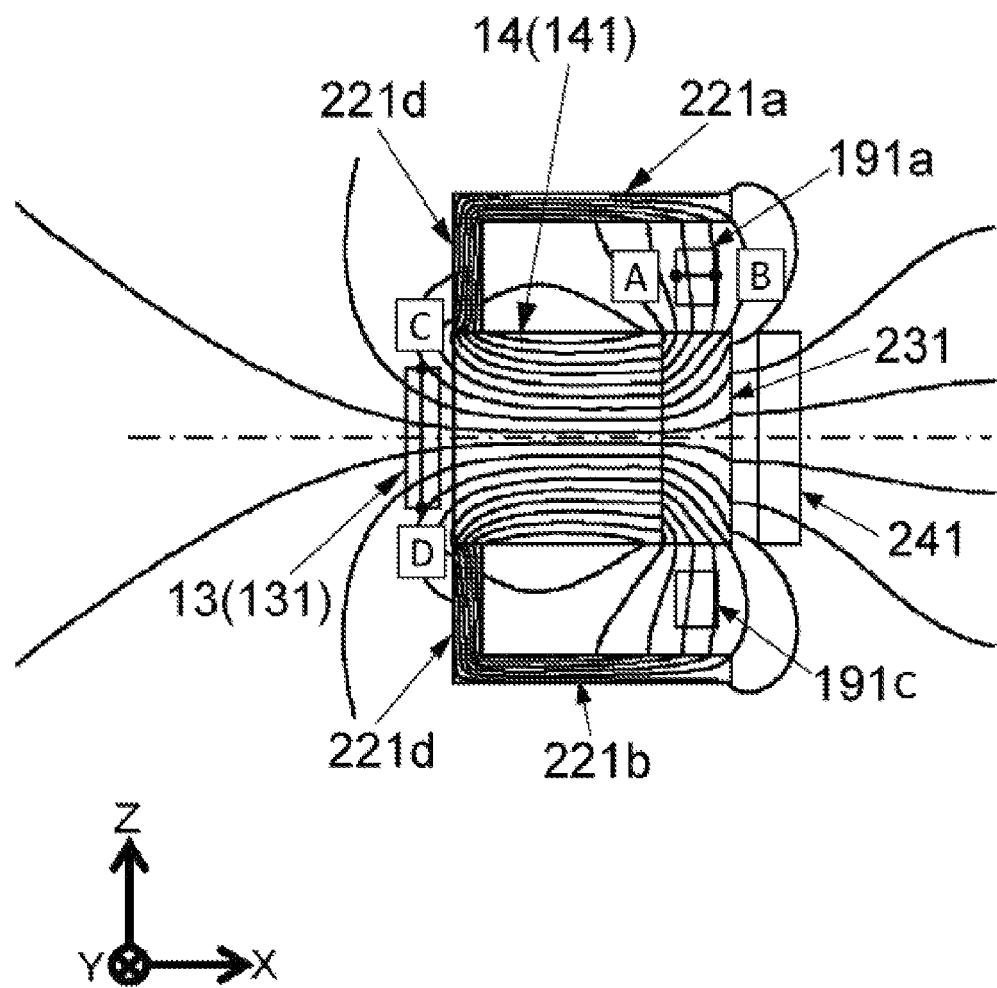
FIG. 11 is a diagram illustrating an example of the distribution of a magnetic field generated by the magnets for driving in the second embodiment.
Figure 12:
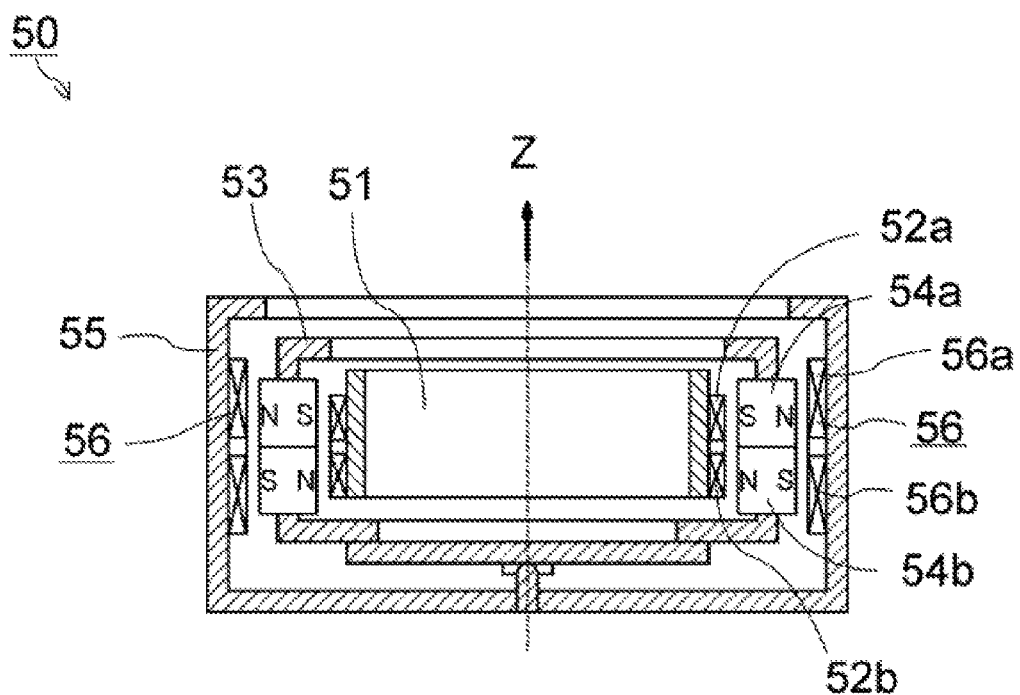
FIG. 12 is a cross-sectional view of an existing optical device for shooting.

FIG. 11 is a diagram illustrating the distribution of the magnetic field generated by the magnet piece 141 of the magnet 14. Through the comparison between FIG. 3 and FIG. 11, in the embodiment, the frame-shaped magnet yoke 22 to the coaxial magnet yoke 23 are arranged, and thus the magnetic flux density crossed with the edges of the first coil 191 can be greatly increased.

FIG. 4A and FIG. 4B are diagrams illustrating the magnetic flux density of the magnetic field intersected with the coil 191 on the +Z side in the second embodiment with solid lines. The horizontal axis in the figures illustrates the distance (mm) between the point A (on the +Z side edge 191 close to one side of the magnet piece 141) and the point B (on the +Z side edge 191 close to the other opposite side of the magnet piece 141) as shown in FIG. 11. Moreover, the longitudinal axis illustrates the magnetic flux density (T). In the structure of the second embodiment, compared with the condition, without the frame-shaped magnet yoke 22 and the coaxial magnet yoke 23, illustrated by the imaginary lines, the magnetic flux density intersected with the +Z side of the coil 191 can be greatly increased, and the change of the magnetic flux density is further alleviated. Moreover, the magnetic flux density of the magnetic filed intersected with the edge 131 of the driving coil 13 is the same as the condition without the frame-shaped magnet yoke 22 and coaxial magnet yoke 23 illustrated by the imaginary lines in the figures, but the magnetic flux density on the ±Z side end parts of the driving coil 13 is greatly reduced.

As mentioned above, the edge 13j of the driving coil 13 can be driven by the magnet 14 (magnet piece 14j), and lorentz force generated by the four edges of the j-th coil 19j can be greatly increased (in which j is equal to 1 to 4).

The configuration of the driving coil 13, the magnets 14 and the swinging coils 19 in the electromagnetic driving device 1Y is the same as those of the electromagnetic driving device 1, and by controlling the current flowing to the first to the fourth coil 191, 192, 193, 194, the inner side box body can swing around the axis vertical to the Z axis relatively. From this, under the condition that even if the optical device 3 shakes, the shaking can also be inhibited reliably.

Moreover, due to the fact the electromagnetic driving device 1Y is provided with the non-magnetic electric conducting component 24, and the inner side box body 12 can move towards the outer side box body 18, so when the frame-shaped magnet yoke 22 and the coaxial magnet yoke 23 get close to the outer side box body 18, the eddy current is generated in the non-magnetic electric conducting component 24. Thus, the inner side box body 12 is subjected to repulsive force generated by the eddy current, and thus the impact strength the outer side box body 18 suffered when the frame-shaped magnet yoke 22 and the coaxial magnet yoke 23 impact the outer side box body 18 can be greatly reduced, and an action noise (impact noise) generated by the impact can be greatly reduced accordingly. Moreover, the components can be prevented from being damaged by the impact.

Moreover, there are two types of magnet yokes (the frame-shaped magnet yoke 22 and the coaxial magnet yoke 23) arranged in the second embodiment, but any one of the frame-shaped magnet yoke 22 and the coaxial magnet yoke 23 can be arranged.

Moreover, only the first, the second, and the third magnet yokes 22ja, 22jb, 22jc can be used in the frame-shaped magnet yoke 22j (in which j is equal to 1 to 4), and thus the magnetic flux density that the edges of the first coil 191 are intersected can be greatly increased, and then the fourth magnet yoke 22jd can be omitted.

The above describes the present invention in detail by utilizing the embodiments, but the technical scope of the present invention is not limited to the range of the embodiments. A person skilled in the art can know that it is obvious that the embodiments are changed or improved variously. The embodiments carrying out the modification or improvement may also be contained in the technical scope of the present invention, and can also be illustrated in claims.

What is claimed is:
1. An electromagnetic driving device, comprising:
a lens support configured for retaining a lens;
an inner side box body configured for supporting the lens support to be capable of moving in a direction of Z axis parallel to an optical axis of the lens;
an outer side box body configured on the outer side of the inner side box body in a manner of surrounding the inner side box body so as to support the inner side box body to be capable of swinging;
a driving coil wound around the Z axis and mounted on the lens support;
a plurality of magnets mounted in the inner side box body;
a plurality of swinging coils mounted in the outer side box body; and
a plurality of magnet yokes configured on surfaces, adjacent to the outer side box body, of the plurality of magnet pieces and/or outside of the plurality of coil components;
wherein each swinging coil comprises a wire wrapping part wound around an axis perpendicular to the Z axis, and a coil component wound around the wire wrapping part; all of the plurality of swinging coils are configured around the Z axis at equal angles;
wherein the plurality of magnets comprise a plurality of magnet pieces configured corresponding to the plurality of coil components and disposed around the Z axis at equal angles;
wherein when each magnet piece is observed in a direction perpendicular to the Z axis, the magnet piece and a corresponding one of the plurality of wire wrapping parts are partitioned at an interval and arranged opposite to each other on an inner side of the corresponding one of the plurality of wire wrapping parts;
wherein when each magnet piece is observed in the direction of Z axis, a magnetic pole face, adjacent to a corresponding one of the plurality of coil components and configured closer to the inner side box body than the corresponding one of the plurality of coil components, of the magnet piece and the corresponding one of the plurality of coil components are partitioned at an interval and arranged opposite to each other; or when each magnet piece is observed in the direction of Z axis, the magnetic pole face, adjacent to the corresponding one of the plurality of coil components, of the magnet piece is positioned on the inner sides of the corresponding one of the plurality of wire wrapping parts;
wherein the electromagnetic driving device further comprises a plurality of non-magnetic electric conducting components mounted on the inner side of the outer side box body, and each non-magnetic electric conducting component is arranged opposite to a corresponding one of the plurality of magnet pieces;
wherein each of the plurality of magnet yokes configured outside of the plurality of coil components comprises:
a first magnet yoke covering a first edge of a corresponding one of the plurality of coil components from a front side of the Z axis;
a second magnet yoke covering a second edge of the corresponding one of the plurality of coil components from a rear side of the Z axis;
a third magnet yoke and a fourth magnet yoke respectively covering a third edge and a fourth edge of the corresponding one of the plurality of coil components, wherein when combined with the first and second magnet yokes a box is formed around the one of the plurality of coil components; and
a fifth magnet yoke covering a winding side, close to the corresponding one of the plurality of magnet pieces, of the corresponding one of the plurality of coil components;
wherein the fifth magnet yoke comprises a plate defining an opening part, and the magnetic pole face, close to the driving coil, of a corresponding one of the plurality of magnet pieces is disposed in the opening part;
wherein the electromagnetic driving device further comprises a plurality of coil mounting components mounted on the inner side of the outer side box body; wherein each coil mounting component comprises a square frame-shaped base plate mounted on the inner side of the outer side box body and a plurality of projection pieces protruding from four edges of the base plate towards the lens support, each swinging coil is mounted on ends of a corresponding one of the plurality of projection pieces, and each non-magnetic electric conducting component is mounted in a frame defined in the base plate of a corresponding coil mounting component.

2. The electromagnetic driving device according to claim 1, wherein further comprising a plurality of coaxial magnet yokes, wherein each coaxial magnet yoke is attached to a magnet pole face which is adjacent to the outer side box body of a corresponding one of the plurality of magnet pieces, and each coaxial magnet yoke and an inner side of a corresponding one of the plurality of swinging coils are partitioned at an interval and are arranged opposite to each other.

* * * * *